No. 3,303. PATENTED OCT. 12, 1843.
H. H. EVARTS.
PLAN FOR STRAW AND ROOT CUTTERS.
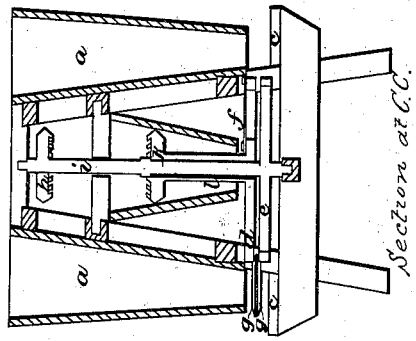
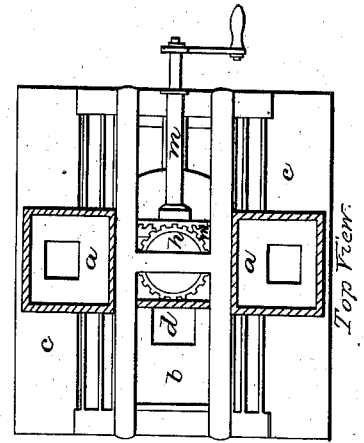
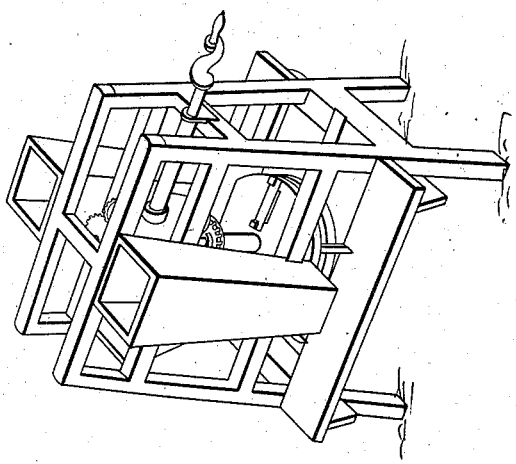
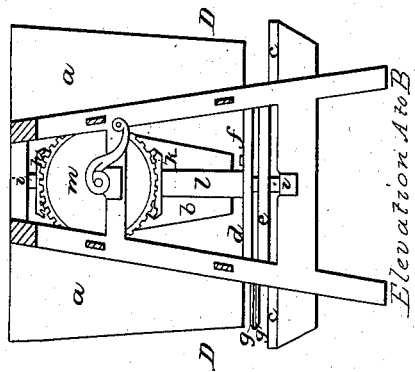
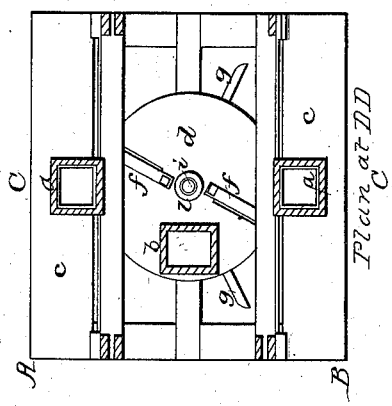
Inventor;
Harry H. Evarts

UNITED STATES PATENT OFFICE.

HARRY H. EVARTS, OF MOUNT MORRIS, NEW YORK.

STRAW-CUTTER.

Specification of Letters Patent No. 3,303, dated October 12, 1843.

*To all whom it may concern:*

Be it known that I, HARRY H. EVARTS, of the town of Mount Morris, in the county of Livingston and State of New York, have invented a new and useful Machine for Cutting Straw and Roots; and I do hereby declare that the following is a full, clear, and exact description of the construction and operation of the same, reference being had to the annexed drawings, which make a part of this specification.

I erect a perpendicular revolving shaft $i$ (see drawings) two feet five inches long upon and near the lower end of which I fix or place firmly a balance wheel $e$ one foot and nine inches in diameter with a rim and two arms. Immediately above this and upon the hollow shaft $l$ I place another balance wheel $d$ of the same diameter having its upper surface a plane. The hollow shaft $l$ is eleven inches perpendicular length has upon its upper end a bevel pinion $k$ four inches in diameter and revolves around shaft $i$. Upon shaft $i$ near its upper end I fasten another pinion $h$ like the first. Between these pinions I place a bevel wheel $m$, on and near the end of the horizontal shaft $m$ upon the outer end of which is the hand crank. I then bolt a knife $g$ upon each of the contiguous surfaces of the balance extending out from the periphery of each seven inches in such manner that they will pass each other under the hoppers $a$, $a$, into the top of which the straw is inserted and falls upon the tables $c$, $c$. Then if by means of the hand crank the wheel $m$ be made to revolve the pinions $h$ and $k$ will move in opposite directions and consequently the shafts $i$ and $l$, the balance-wheel and knives will move in corresponding contrary directions and the knives passing under the hoppers cut in the same manner as shears (see elevation and section of drawings) the cut straw being thrown off from the tables by the lower knife the upper straw immediately falls on to the tables ready for the repassing of the knives. Through the upper balance wheel $d$ which is plane on its upper surface I make two orifices 7½ inches long by 2½ inches wide, over which I place two knives $f$, $f$, ⅜ inch above the surface of the wheel. If roots be placed in the hopper $b$ they will fall upon balance wheel $d$ and when the knives $f$, $f$, pass they will cut off three eighths inch in thickness from the roots and the pieces will pass through the orifices and fall under the machine. For frames see annexed drawings.

What I claim as my invention is—

The manner in which I have arranged the knives projecting out from the revolving disks and so as to pass each other under the hoppers and also the arrangement of the several hoppers as described.

HARRY H. EVARTS.

Witnesses:
 JOSEPH CRUNE, Jr.,
 GEORGE H. ELLIOTT.